United States Patent [19]

Shields

[11] Patent Number: 4,589,202

[45] Date of Patent: May 20, 1986

[54] APPARATUS FOR CRIMPING EDGES OF WORKPIECES

[76] Inventor: Walter Shields, 181-41 Henley Road, Jamaica, N.Y. 11432

[21] Appl. No.: 637,932

[22] Filed: Aug. 6, 1984

[51] Int. Cl.$^4$ .......................... B23P 19/00; B65B 7/28
[52] U.S. Cl. ......................................... 29/822; 53/329
[58] Field of Search .......................... 53/329, 339, 349; 29/822

[56] References Cited

U.S. PATENT DOCUMENTS

| | | | |
|---|---|---|---|
| 2,994,172 | 8/1961 | Shields | 53/329 |
| 3,091,068 | 5/1963 | Shields | 53/349 |
| 3,422,598 | 1/1969 | Shields | 53/339 |
| 3,538,672 | 11/1970 | Shields | 53/067 |
| 3,623,210 | 11/1971 | Shields | 53/349 |
| 3,801,291 | 4/1974 | Shields | 29/777 |

Primary Examiner—Howard N. Goldberg
Assistant Examiner—Steven Nichols
Attorney, Agent, or Firm—Jordan and Hamburg

[57] ABSTRACT

An apparatus for crimping edges of workpieces comprises a workpiece supplying device for consecutively supplying the workpieces, a rotary support member situated under the workpiece supplying device for supporting the workpiece one by one, a crimping device for crimping the workpieces, and a driving mechanism for operating the rotary support member and the crimping device. The crimping device includes a base member immovably situated under the workpiece supplying device, a first frame pivotally connected to the base member, a crimping member rotationally connected to the first frame, a roller connected to the crimping member, and a frame moving device for pivotally moving the frame relative to the base member. The driving mechanism comprises a first driving device for rotating the rotary support member, a second driving device for reciprocally moving the rotary support member toward the workpiece supplying device, and a third driving device for operating the frame moving device. When the third driving device is actuated, the frame is inclined relative to the base member so that when the workpiece is situated on the support member, the roller contacts the rotary support member and the crimping member touches the edge of the workpiece. Consequently, the crimping member rotates and crimps the edge of the workpiece.

20 Claims, 12 Drawing Figures

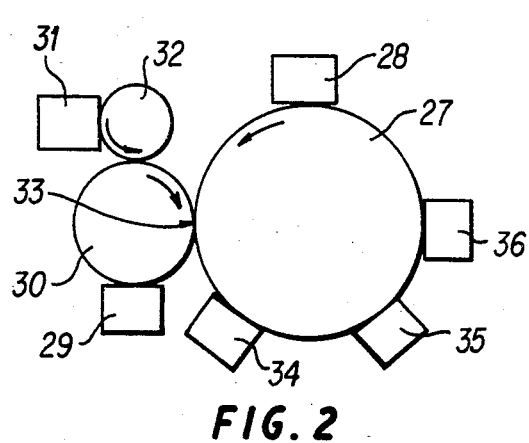
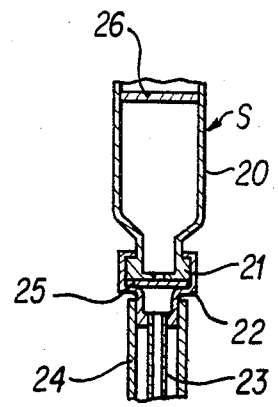
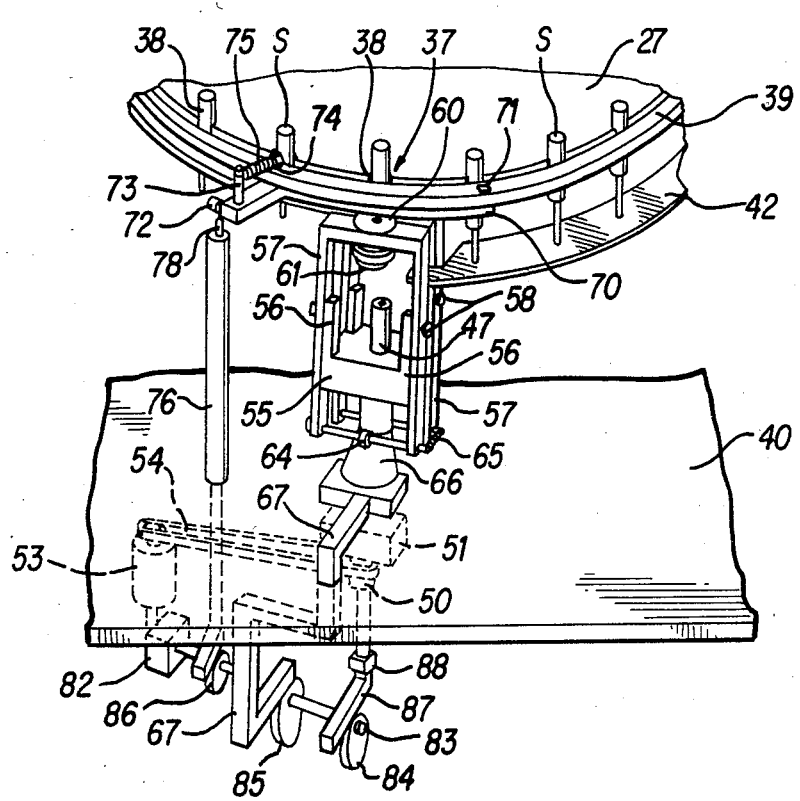
FIG. 2
FIG. 1
FIG. 3

APPARATUS FOR CRIMPING EDGES OF WORKPIECES

BACKGROUND OF THE INVENTION AND RELATED ART STATEMENT

The present invention relates to an apparatus for continuously crimping edges of work pieces, more particularly an apparatus for crimping edges of needle supporting caps to syringe barrels.

Apparatus for crimping closure caps to vials or apparatus for crimping needle supporting caps to syringe barrels are known, for example, U.S. Pat. Nos. 2,994,172, 3,091,068, 3,422,598, 3,538,672 and 3,801,291. These apparatus operate properly as intended but are complicated in structure. Further, the apparatus in the prior art patents are provided with crimping parts and associated parts thereof, which are located on a syringe barrel transfer device, so that the syringe barrel and other parts of the syringe may be contaminated by dusts from these moving parts.

Accordingly, an object of the invention is to provide an apparatus for crimping edges of workpieces, which is simple in structure and operates reliably.

Another object of the invention is to provide an apparatus as stated above, in which ambience around the apparatus can be kept clean.

Further objects and advantages of the invention will be apparent from the following description of the invention.

SUMMARY OF THE INVENTION

In accordance with the invention, an apparatus for crimping edges of workpieces comprises means for consecutively supplying the workpieces, a rotary support member situated under the workpiece supplying means for supporting the workpiece one by one during crimping, a crimping device situated under the workpiece supplying means, and a driving mechanism for the apparatus.

The crimping device includes a base member immovably situated under the workpiece supplying means, a first frame pivotally connected to the base member, a crimpling member rotationally connected to the first frame, a roller connected to the crimping member so that when the roller rotates, the crimping member rotates as well, and means for pivotally moving the frame relative to the base member. The driving mechanism includes first driving means for rotating the rotary support member, a second driving means for reciprocally moving the rotary support member toward the supplying means, and third driving means for operating the frame moving means. The third driving means, when actuated, urges the frame to incline relative to the base member so that when the workpiece is situated on the rotary support member, the roller contacts the rotary support member and the crimping member touches the edge of the workpiece. Consequently, the crimping member rotates and crimps the edge of the workpiece.

The apparatus of the invention further comprises means for holding the workpieces relative to the workpiece supplying means, and an actuation device for operating the workpiece holding means so that the workpiece is temporarily released from the workpiece holding means. The driving mechanism further includes fourth driving means for operating the actuation device. The fourth driving means operates while the third driving means operates so that the workpiece transmitted by the workpiece supplying means is situated on and rotates together with the rotary support member during crimping action performed by the crimping device.

The crimping device is preferably further includes a second frame pivotally connected to the base member adjacent to the first frame, an additional crimping member rotationally connected to the second frame, and an additional roller connected to the crimping member on the second frame. When the additional roller rotates, the additional crimping member rotates as well. The rotary support member passes through the base member of the crimping devise. The second frame, additional crimping member and additional roller face against the first frame, crimping member and roller symmetrically with respect to the rotary support member.

The frame moving means of the crimping device is provided with two contact rollers connected to the respective first and second frames, and a tapered member vertically and movably situated between the contact rollers. The tapered member is connected to the third driving means of the driving mechanism so that when the tapered member is vertically moved by means of the operation of the third driving means, the contact rollers are expanded outwardly. Consequently, the upper portions of the frames are moved inwardly, wherein the rollers contact the rotating support member and the crimping members touch the edge of the workpiece on the rotary support member. The workpiece on the rotary support member rotates, and the crimping members situated on the edge of the workpiece rotate as well, so that the crimping operation is performed.

BRIEF DESCRIPTION OF THE DRAWINGS

FIG. 1 is a section view of a syringe assembly to be crimped in accordance with the present invention;

FIG. 2 is a diagrammatic view of an entire system for automatically assembling a syringe assembly;

FIG. 3 is a perspective view of a crimping apparatus in accordance with the present invention;

DETAILED DESCRIPTION OF PREFERRED EMBODIMENTS

Figure 4:
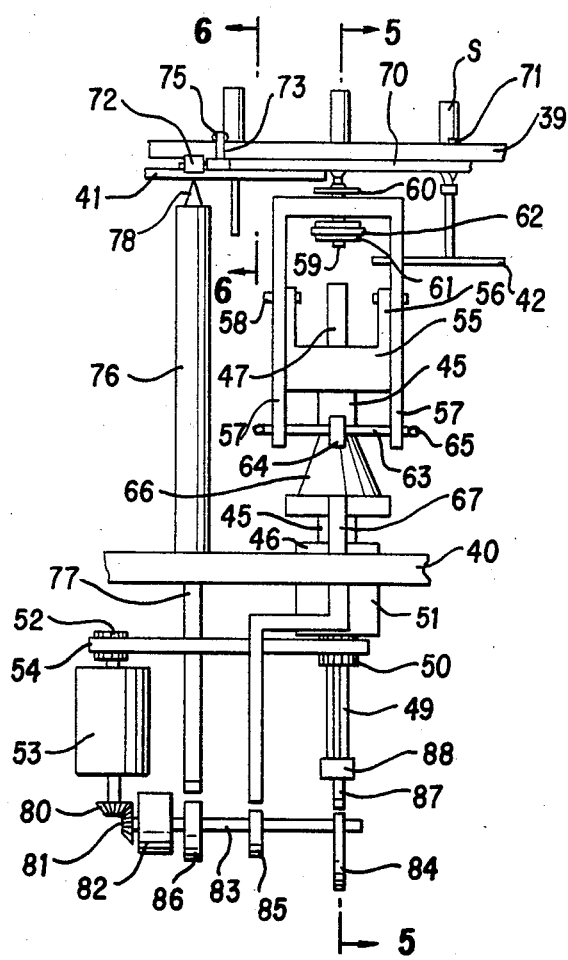
FIG. 4 is a side view of the crimping apparatus.

In accordance with a preferred embodiment of the invention, a crimping apparatus of the invention is employed in a system for automatically preparing syringe assemblies S. in which edges of needle supporting caps are continuously crimped to syringe vials.

In particular, the syringe assembly S assembled by the entire system as stated above comprises, as shown in FIG. 1, a syringe vial 20 having a front end 21, a cap 22 connected to the front end 21, and a needle 23 attached to the cap 22. A sheath 24 is removably placed on the cap 22 for covering the needle 23, and two valves 25,26 are disposed inside the syringe vial 20 to keep syringe liquid inside the vial until the syringe assembly S isused.

In the system for automatically assembling syringe assemblies S as shown in FIG. 2, when a turn table 27 is rotated about three fourth in the direction shown by an arrow, parts are assembled and complete syringe assemblies S are continuously formed. Namely, syringe vials 20 are continuously supplied onto the turn table 27 at a station 28, wherein the front ends 21 of the vials 20 are oriented downwardly. Cap assemblies, each including the cap 22, the needle 23 connected to the cap 22 and the sheath 24 situated over the needle 23, are stored in a station 29 and are successively supplied onto a turn table 30 rotating in the direction shown by an arrow. In the turn table 30, the needles 23 are oriented downwardly. the valves 25 stored in a station 31 are continuously disposed in the caps 22 by means of a valve transfer device 32. At a position 33, the cap assemblies with the valves 25 are temporarily attached to the front ends 21 of the springe vials 20. Thereafter, edges of the caps 22 are securedly crimped at a station 34. Then, syringe liquid is supplied into the vials 20 at a station 35 and the valves 26 are situated in the vials 20 at a station 36.

The crimping apparatus in accordance with the present invention is situated at the station 34 in the system as explained above so that the caps 22 are securely crimped to the front ends 21 of the syringe vials 20 one by one. Namely, although the syringe S is continuously tranferred by means of the turn table, when the syringe S is stopped at a crimping position 37, the edge of the cap 22 is completely crimped to the front end 21 of the vial 20.

Figure 6:
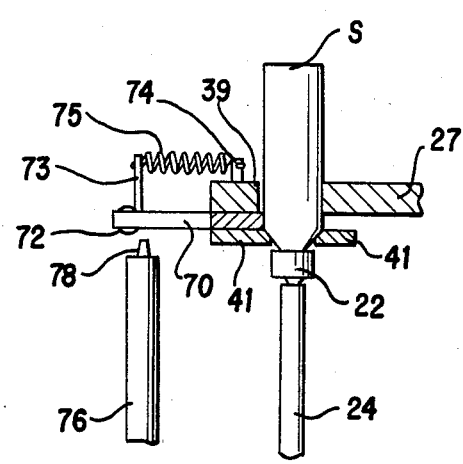
FIG. 6 is an enlarged section view taken along a line 6—6 in FIG. 4.

As shown in FIG. 3, the turn table 27 is provided with a plurality of notches 38 for receiving the syringes S therein, and a side wall 39 is arranged around the turn table. The side wall 39 is connected to a base 40 by means of rods (not shown). The side wall 39 does not, therefore, rotate together with the turn table 27. Under the side wall 39, two kinds of support plates are situated for supporting the syringes S. Namely, a pair of support plates 41 is situated from the position 33 to the crimping position 37 to support shoulders of the vials 20 as best seen in FIG. 6. The support plates 41 are connected to the side wall 39 (not shown). Further, a support plate 42 is disposed from the crimping position 37 to the last position in the system, wherein lower ends of the sheath 24 are supported by the support plate 42. The support 42 is also connected to the side wall 39 (not shown). Therefore, the syringes S are supported by the support plates 41, 42 except the crimping position 37 and are continuously transferred by the turn table 27.

Figure 5:
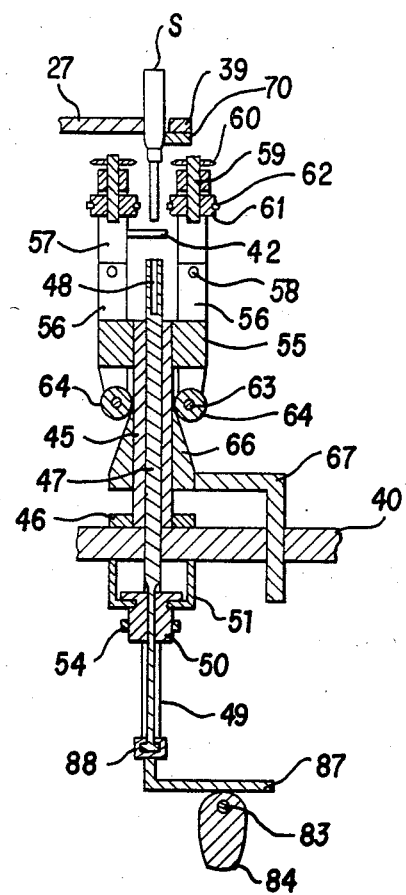
FIG. 5 is a section view taken along a line 5—5 in FIG. 4.

As clearly shown in FIG. 5, a cylinder 45 and a flange 46 for supporting the cylinder 45 are firmly attached on the base 40 at the crimping position 37. A support rod 47 is rotationally situated inside the cylinder 45. The support rod 47 is provided with a dent 48 at an upper end for receiving therein a sheath 24 to support the syringe S when crimping, and a plurality of slits 49 at a lower side position thereof. The slits 49 are engaged with a sprocket 50 rotationally supported by a housing 51 attached to the base 40. The sprocket 50 is connected to a sprocket 52 of a motor 53 by means of a belt 54, so that when the motor 53 rotates, the support rod 47 also rotates. Since the slits 49 are slidably engaged with the sprocket 50, the support rod 47 can be vertically moved relative to the base 40 during rotation of the support rod 47. Mechanism for moving the support rod 47 vertically will be explained hereinafter.

Connected to an upper end of the cylinder 45 is a base member 55 having four arms 56 extending upwardly therefrom. Two frames 57 are pivotally connected to the upper portions of the arms 56 by means of pins 58 so that the frames 57 are parallel to each other, and when the frames are opened, the syringe S on the turn table 27 can pass between the two frames 57.

Each frame 57 is provided with a shaft 59 rotationally connected to the upper portion of the frame 57. A crimping disc 60 and a pulley 61 with a rubber band 62 therearound are connected to the upper and lower ends of the shaft 59. A shaft 63 is connected to the lower portion of each frame 57, and a roller 64 is free-rotationally situated on the shaft 63. Two springs 65 are disposed between the shafts 63 so that the lower ends of the frame 57 are pulled together. When the rollers 64 are situated on the outer surface of the cylinder 45, the two frames 57 are oriented to be substantially parallel to each other.

A tapered member 66 is slidably disposed around the cylinder 45, and a rod 67 is connected to the tapered member 66 so that when the rod 67 is moved vertically, the tapered member 66 is moved as well. As explained later in detail, when the tapered member 66 is moved upwardly, the tapered member 66 engages the rollers 64 connected to the frames 57 to push the lower portions of the frames 57 outwardly. Consequently, the upper portions of the frames 57 come closer.

The crimping apparatus of the invention is further provided with a holding plate 70 rotationally connected at one end thereof to the side wall 39 by means of a pin 71. A roller 72 and a stud 73 are attached at the other end of the holding plate 70. The side wall 39 is also provided with a stud 74. A spring 75 is situated between the studs 73 and 74 to urge the holding plate 70 towards the turn table 27. Therefore, when the holding plate 70 is urged by the spring 75, the syringe vial 20 in the notch 38 of the turn table 27 is pushed against the wall of the notch 38. Consequently, even if the syringe S is not supported by the support plates 41 and 42, the syringe S is held in the notch 38. Namely, the syringe S does not fall downwardly from the notch 38 at the crimping position 37 while the holding plate 70 supports the syringe S. In this situation, if the turn table 27 rotates, the syringe S is moved together with the turn table 27.

A hollow pipe 76 is connected to the base 40, in which a rod 77 having a tapered head 78 is slidably disposed. The upper end of the tapered head 78 is located close to the turn table 27 relative to the central axis of the roller 72. Therefore, when the rod 77 is moved upwardly, the tapered head 78 engages the roller 72 to thereby move the holding plate 70 outwardly. In case the syringe S is supported by the holding plate 70 at the crimping position 37, when the holding plate 70 is moved outwardly by means of the rod 77, the syringe S in the notch 38 is no more held by any means. Consequently, the syringe S at the crimping position 37 falls downwardly. Namely, the rod 77 controls the position of the syringe S at the crimping position 37.

As stated before, the motor 53 is situated under the base 40. The motor 53 is provided with a gear 80 to engage a gear 81 attached to a gear box 82. A shaft 83 having three cams 84, 85, 86 is connected to the gear box 82, whereby when the motor 53 rotates, the shaft 83 rotates as well.

Disposed on the cam 84 is a cam follower 87 having a connector 88 connecting the cam follower 87 to the lower end of rotational support rod 47. As explained before, the support rod 47 is rotated by the motor 53. At the same time, if the cam 84 is rotated, the cam follower 87 vertically moves, so that the support rod 47 moves in the vertical direction. On the cam 85, the lower end of the rod 67 is siutated, so that when the cam 85 rotates, the tapered member 66 connected to the rod 67 moves in the vertical direction. On the cam 86, the lower end of the rod 77 is positioned. When the cam 86 rotates, the rod 77 moves in the vertical direction.

Referring to FIGS. 7-11, crimping operation for crimping an edge of the cap 22 to the front end 21 of the vial 20 is explained. It is assumed that the syringe S has just transferred by rotation of the turn table 27 to the crimping position 37 as shown in FIGS. 3-5. In this position, the holding plate 70 is urged toward the turn table 27 by means of the spring 75, so that the syringe S is immovably held in the notch 38 at the crimping position 37. The support rod 47 is rotating and is located in the lower position.

Figure 7:
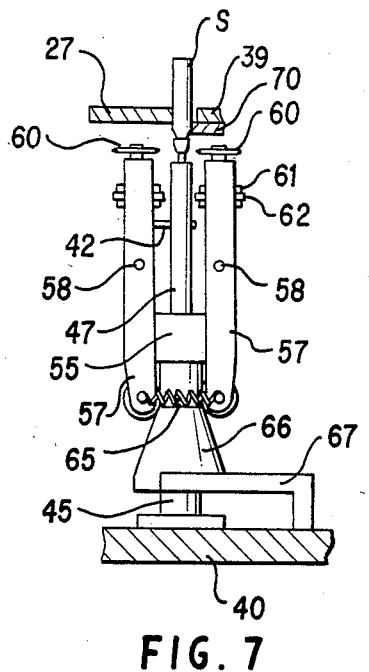
FIGS. 7-11 are side views of a main part of the crimping apparatus for showing a crimping process in accordance with the invention.
Figure 8:
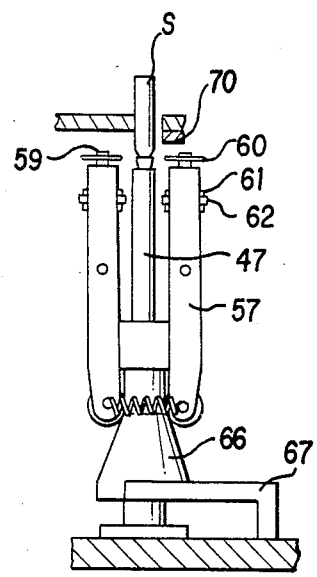

Firstly, the rod 47 is moved upwardly by means of the cam 84 as shown in FIG. 7, wherein the sheath 24 is substantially situated in the dent 48 of the rod 47. Then, the rod 77 is moved upwardly by means of the cam 86 so that the holding plate 70 is moved away from the turn table 27. Consequently, the syringe S held between the wall of the notch 38 and the holding plate 70 falls downwardly onto the rod 47, as shown in FIG. 8. The syringe S is located on the rod 47 at a proper position for crimping. In this position, the syringe S rotates together with the rod 47.

Figure 9:
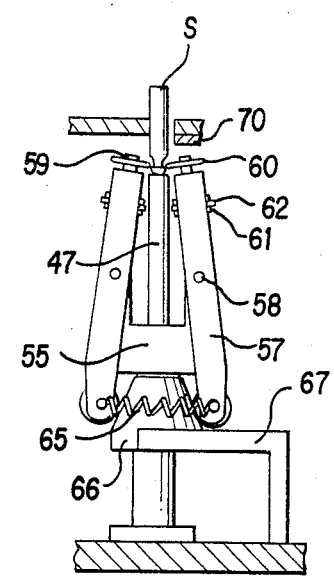

Thereafter, the cam 85 operates to move the tapered member 66 upwardly. Consequently, the lower portions of the frames 57 are pushed outwardly, and the upper portions of the frames 57 are moved inwardly, as shown in FIG. 9. The rubber bands 62 on the pulleys 61 contact the rotating support rod 47, so that the shafts 59 and the crimping discs 60 rotate as well. When the upper portions of the frames 57 are in the inward position, the edges of the crimping discs 60 are located on the edge of the cap 22. Since the syringe S and the crimping discs 60 rotate in this position, the edge of the cap 22 can be properly crimped.

Figure 10:
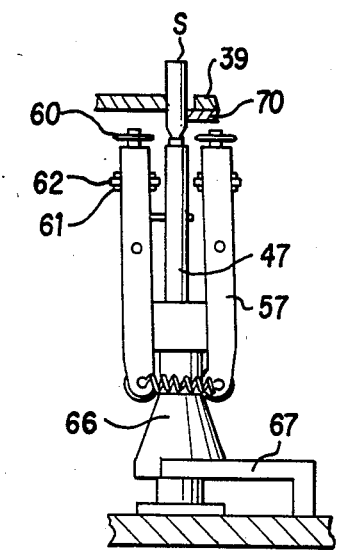

After the crimping is finished, the tapered member 66 is moved downwardly, so that the frames 57 are returned to the original position by means of the spring 65. Then, the rod 77 which was moved upwardly is moved downwardly. Consequently, the holding plate 70 pushes the syringe S toward the wall of the notch 38 to hold the syringe S in the notch 38, as shown in FIG. 10.

Figure 11:
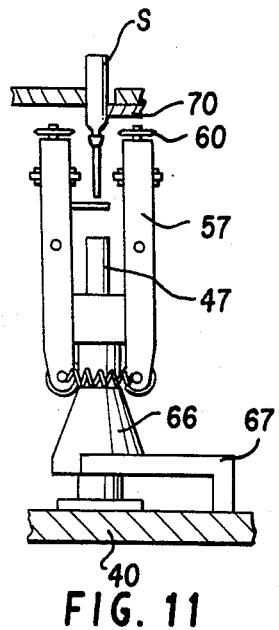

Finally, the support rod 47 is moved downwardly as shown in FIG. 11. Since the syringe S is held in the notch 38 by means of the holding plate 70, the syringe S does not fall downwardly together with the downward movement of the rod 47. In this position, the turn table 27 is rotated to bring the new syringe to the crimping position again, and the same crimping procedure is repeated.

Figure 12:
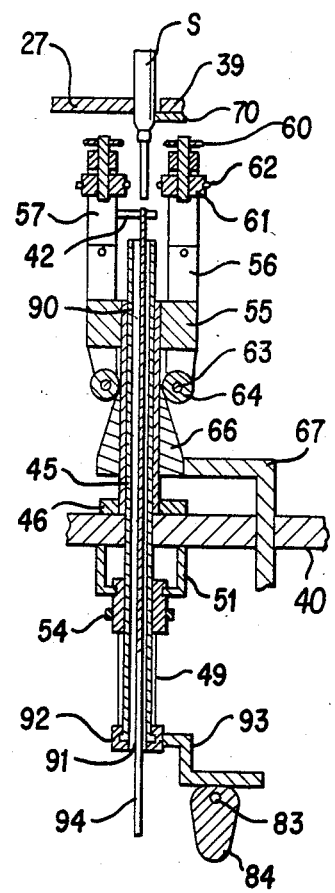
FIG. 12 is a section view similar to FIG. 5 for showing another embodiment of the present invention.

In FIG. 12, another embodiment of the crimping apparatus in accordance with the present invention is shown. The embodiment in FIG. 12 is similar to the first embodiment, so that the same numerals are alotted to the same parts throughout the first and second embodiments.

In the second embodiment as shown in FIG. 12, a support rod 90 is employed instead of the support rod 47 in the first embodiment. The support rod 90 is provided with a through hole 91 throughout the support rod along the central axis thereof. A lower end of the support rod 90 is provided with a connector 92, to which a cam follower 93 mounted on the cam 84 is connected. Therefore, when the cam 84 is rotated, the support rod 90 is vertically reciprocated as in the support rod 47.

A stationary rod 94 mounted on a frame of the crimping apparatus is situated in the through hole 91. The upper end of the stationary rod 94 is located substantially at a horizontal level equal to the support plate 42. Therefore, when the support rod 90 is situated in the upper position, the upper end of the stationary rod is located inside the support rod 90. On the other hand, when the support rod 90 is situated in the lower position, the upper end of the stationary rod is located above the upper end of the support rod 90.

The second embodiment as shown in FIG. 12 operates as in the first embodiment, Namely, when the support rod 90 is moved to the upper positon, the syringe S is released from the turn table 27 so that the sheath 24 is located in the hole 91 of the support rod 90. After the crimping operation is performed, the syringe S is held in the notch 38 of the turn table by means of the holding plate 70. Then, the support rod 90 is moved downwardly, and the turn table 27 rotates to transfer the next syringe S for crimping.

In the above procedure, when the crimping operation is performed, the sheath 24 is sometimes firmly engaged inside the dent 48 or hole 91 because the edge of the cap 22 is strongly pushed onto the support rod 47 or 90 by the crimping discs 60. In this case, even if the syringe S is held by the holding plate 70, the syringe S moves downwardly together with the support rod 47 or 90. In the embodiment in FIG. 12, however, even if the syringe S engages the support rod 90, when the support rod 90 is moved downwardly, the syringe S is disengaged from the support rod 90 by means of the stationary rod 94. Therefore, the crimping operation can be smoothly performed.

While the invention has been explained with reference to the specific embodiments of the invention, the explanation is illustrative and the invention is limited only by the appended claims.

What is claimed is:
1. An apparatus for crimping edges of workpieces comprising:
  means for consecutively supplying the workpieces,
  a rotary support member situated under the workpiece supplying means for supporting the workpiece one by one during crimping,
  a crimping device including a base member immovably situated under the workpiece supplying means, a first frame pivotally connected to the base member, a crimping member rotationally connected to the first frame, a roller connected to said crimping member so that when the roller rotates, the crimping member rotates as well, and means for pivotally moving the frame relative to the base member, and
  a driving mechanism including first driving means for rotating the rotary support member, second driving means for reciprocally moving the rotary support member toward the workpiece supplying means, and third driving means for operating the frame moving means, said third driving means when actuated, urging the frame to incline relative to the base member so that when the workpiece is situated on the rotary support member, the roller contacts the rotary support member and the crimping member touches the edge of the workpiece, whereby the crimping member rotates and crimps the edge of the workpiece on the rotary support member.

2. An apparatus according to claim 1, further comprising means for holding the workpieces relative to the workpiece supplying means situated adjacent to the workpiece supplying means, and an actuation device for operating the workpiece holding means so that the workpiece is temporarily released from the workpiece holding means, said driving mechanism further including fourth driving means for operating the actuation device, said fourth driving means being actuated while the third driving means operates so that the workpiece transmitted by the workpiece supplying means is situated on and rotates together with the rotary support member during crimping performed by the crimping device.

3. An apparatus according to claim 2, in which said crimping device further includes a second frame pivotally connected to the base member adjacent to the first frame, an additional crimping member rotationally connected to the second frame, and an additional roller connected to the crimping member on the second frame so that when the additional roller rotates, the additional crimping member rotates as well, said second frame, additional crimping member and additional roller symmetrically facing against said first frame, crimping member and roller respectively.

4. An apparatus according to claim 3, in which said rotary support member passes through the base member of the crimping device so that the frames, crimping members and rollers are equidistantly away from the rotary support member respectively.

5. An apparatus according to claim 4, in which said frame moving means of the crimping device includes two contact rollers connected to the respective first and second frames, and a tapered member movably situated between the contact rollers, said tapered member being connected to the third driving means of the driving mechanism so that when the tapered member is vertically moved by means of the third driving means, the contact rollers are expanded outwardly.

6. An apparatus according to claim 5, in which said crimping members are situated on the upper portions of the frames, and the contact rollers are located on the lower portions of the frames, whereby when the contact rollers are expanded outwardly by means of the third driving means, the crimping members are moved inwardly for crimping the edge of the workpiece.

7. An apparatus according to claim 6, further comprising a stationary rod for separating the workpiece from the rotary support member after the crimping operation, said rotary support member including a hole extending throughout the rotary support member along a central axis thereof, said stationary rod being situated in the hole so that when the rotary support member is situated in an upper position, an upper end of the stationary rod is located inside the rotary support member, and when the rotary support member is situated in a lower position, the upper end of the stationary rod is located above the rotary support member.

8. An apparatus according to claim 7, in which said driving mechanism further includes power means, a gear connected to the power means, and a shaft connected to the gear.

9. An apparatus according to claim 8, in which said first driving means includes sprocket means slidably situated relative to the rotary support member, and a belt connecting the sprocket means and the power means so that when the power means rotates, the rotary support member rotates.

10. An apparatus according to claim 8, in which said second driving means includes a first cam situated on the shaft, and a first rod rotatably connected to the rotary support member, said first rod being situated on the first cam so that the rotary support member can be vertically moved according to the first cam.

11. An apparatus according to claim 8, in which said third driving means includes a second cam situated on the shaft, and a second rod connected to the tapered member of the frame moving means, said second rod being situated on the second cam so that the tapered member can be vertically moved according to the second cam.

12. An apparatus according to claim 8, in which said fourth driving means includes a third cam situated on the shaft, and a third rod connected to the actuation device, said third rod being situated on the third cam so that the actuation device can be vertically moved according to the third cam.

13. An apparatus for crimping and edge of a needle supporting cap to a syringe barrel, comprising:
a syringe barrel supply device for continuously supplying the syringe barrels with needle supporting caps,
a rotary support member situated under the syringe barrel supply device, said rotary support member supporting the syringe barrel one by one at a crimping position,
a support plate situated under the syringe barrel supply device except the crimping position, said support plate supporting the syringe barrels when transferred by means of the syringe barrel supply device,
a holding device situated adjacent to the syringe barrel supply device, said holding device temporarily holding the syringe barrels relative to the syringe barrel supply device when the syringe barrels pass through the crimping position,
an actuation device for operating the holding device, the syringe barrel at the crimping position, when the actuation device operates, being released from the syringe barrel supply device and situated on the rotary support member for crimping,
a crimping device including a base member immovably situated under the syringe barrel supply device, said rotary support member passing through the base member, two frames pivotally connected to the base member and symmetrically arranged relative to the rotary support member, two crimping members rotationally connected to the respective frames, two rollers connected to the respective crimping members so that when the rollers rotate, the crimping members rotate as well, two contact rollers situated at the lower portions of the respective frames, and a tapered member situated between the contact rollers, and
a driving mechanism including a first driving device for rotating the rotary support member, a second driving device for reciprocally moving the rotary support member toward the syringe barrel supply device, a third driving device for operating the tapered member, and a fourth driving device for operating the actuation device, whereby firstly the second driving device operates so that the rotary support member moves to an upper position, secondly the fourth driving device operates to locate the syringe barrel from the syringe barrel supply device onto the rotary support member, thirdly, the third driving device operates to move the tapered member upwardly and to incline the frames toward the rotary support member so that the rollers contact the rotary support member for rotation and the crimping members touch the edge of the cap of the syringe barrel for crimping the edge thereof, fourthly, the operation of the fourth driving device is stopped to frictionally connect the syringe barrel to the syringe barrel supply device, fifthly, the second driving device operates to move the rotary support member to a lower position, and finally the syringe barrel supply device rotates to move the syringe barrel from the crimping position.

14. An apparatus according to claim 13, in which said syringe barrel supply device comprises a turn table having a plurality of notches around the outer periphery thereof, said turn table being intermittently rotated by power means, and a side cover situated around the outer periphery of the turn table, said syringe barrels being situated in the notches and held therein by the side cover.

15. An apparatus according to claim 14, in which said holding device includes a holding plate rotationally connected to the side cover of the syringe barrel supply device, and a holding spring connected between the side cover and the holding plate to urge the holding plate toward the side cover, the syringe barrel at the crimping position, when the actuation device is not operated, being held in the notch of the turn table by the holding plate.

16. An apparatus according to claim 15, in which said actuation device comprises an actuation rod having a tapered head, said actuation rod being situated under the holding plate so that when the actuation rod is moved upwardly, the holding plate is moved away from the turn table.

17. An apparatus according to claim 16, in which said driving mechanism further comprises power means, a gear connected to the power means, and a shaft connected to the gear.

18. An apparatus according to claim 17, in which said first driving device includes a sprocket slidably situated relative to the rotary support member and a belt connecting the sprocket and the power means so that when the power means rotates, the rotary support member rotates, said second driving device including a first cam situated on the shaft and a first rod rotatably connected to the rotary support member, said first rod being situated on the first cam so that the rotary support member can be vertically moved according to the first cam, said third driving device including a second cam situated on the shaft and a second rod connected to the tapered member of the crimping device, said second rod being situated on the second cam so that the tapered member can be vertically moved according to the second cam, and said fourth driving device including a third cam situated on the shaft and a third rod connected to the actuation rod, said third rod being situated on the third cam so that the actuation rod can be vertically moved according to the third cam.

19. An apparatus according to claim 18, in which said rotary support member includes a dent extending from an upper end along the axis thereof, the needle supporting cap being substantially situated in the dent when the syringe barrel is supported.

20. An apparatus accordinf to claim 18, further comprising a stationary rod for separating the syringe barrel from the rotary support member after crimping operation, said rotary support member including a hole extending throughout the rotary support member along a central axis thereof, said stationary rod being situated in the hole so that an upper end of the stationary rod is located at a horizontal level equal to the support plate, whereby when the rotary support member is moved to the upper position, the upper end of the stationary rod is located inside the rotary support member to thereby allow the needle supporting cap to be situated inside the hole of the rotary support member for supporting the syringe barrel by the rotary support member, and when the rotary support member is moved to the lower position, the upper end of the stationary rod is located above the rotary support member to prevent the needle supporting cap from moving downwardly together with the rotary support member.

* * * * *